United States Patent Office 3,040,089
Patented June 19, 1962

3,040,089
2,2-DIMETHYL-1-PHENYL-1,3-PROPANDIOL DICARBAMATE
Kurt Kulka, New York, N.Y., assignor to Fritzsche Brothers, Inc., New York, N.Y., a corporation of New York
No Drawing. Filed June 10, 1960, Ser. No. 35,147
1 Claim. (Cl. 260—482)

This invention relates to a new composition of matter and more particularly to 2,2-dimethyl-1-phenyl-1,3-propandiol dicarbamate.

2,2-dimethyl - 1 - phenyl-1,3-propandiol dicarbamate is structurally represented by the formula:

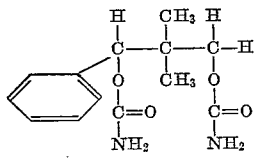

It is a white crystalline solid having a melting point of 150° C., is soluble in hot water, cold ethanol and not benzene. It may be prepared by reacting 2,2-dimethyl-1-phenyl-1,3-propandiol with a compound having the monovalent radical —$CONH_2$ group, such as urethane, urea or carbamyl chloride. Alternatively, it may be produced by reacting ammonia with the di-chloroformate or di-alkyl-carbonate of 2,2-dimethyl-1-phenyl-1,3-propandiol. The di-chloroformate may be prepared by reacting phosgene with 2,2-dimethyl - 1 - phenyl-1,3-propandiol, while the di-alkyl-dicarbonate, such as the di-ethyl carbonate, may be produced by reacting an alkyl chloroformate such as ethyl chloroformate with 2,2-dimethyl-1-phenyl-1,3-propandiol.

The following is a typical example of preparation of 2,2-dimethyl-1-phenyl-1,3-propandiol dicarbamate:

Example

A mixture of 90 g. (½ mole) of 2,2-dimethyl-1-phenyl-1,3-propandiol, 98 g. (1.1 mole) of urethane and 200 ml. of toluene were refluxed with a water trap to remove any moisture present. After cooling the reaction mixture, there was added 3 grams of aluminum isopropoxide which acted as a catalyst. Other catalysts which may be used are other aluminum alcoholates or sodium methoxide. The yield would be lower with the use of sodium methoxide.

The formed azeotrope of ethanol-toluene was distilled through a Vigreux column of 2 feet. The total elapsed reaction time was 18 hours. The solvent was removed by distillation in vacuum and the residue extracted three times with 150 ml. of hot benzene. On permitting the benzene to cool, crystals were formed which were collected on a Buckner funnel. 70 grams of 2,2-dimethyl-1-phenyl-1,3-propandiol dicarbamate, having a melting point of 150° C., were recovered. This yield represented 52.5% of the theoretical. The product was soluble in cold ethanol, hot benzene and hot water.

The 2,2-dimethyl-1-phenyl-1,3-propandiol employed in the production of the dicarbamate was prepared by adding with agitation a mixture of 212 g. (2 moles) of benzaldehyde, 288 g. (4 moles) of isobutyraldehyde and 500 ml. of methanol to a solution of 112 g. potassium hydroxide pellets (testing 85% KOH) in 500 ml. of methanol. The addition was made over a two hour period at a temperature of 42–43° C. and, since the reaction was an exothermic one, cooling was occasionally necessary. Agitation was continued for an additional two hours, the temperature dropping to 29° C. The reaction mixture was then acidified with acetic acid and 300 ml. of methanol were distilled off. The mixture was then cooled and washed successively with 1,000 ml. and 200 ml. of water. The separated water portions were extracted with 75 ml. of benzene. The benzene extract was added to the non-aqueous (organic) portion, the benzene was removed by distillation and the reaction product was then fractionally distilled through a 1½ feet Vigreux column. The glycol, having the structural formula:

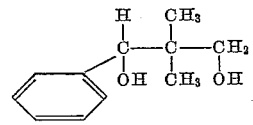

distilled at 152–156° C. at a vacuum of 5–6 mm. There was obtained 268.5 g. of the glycol, representing a 74.5% yield of the theoretical. The glycol crystallized on standing and was recrystallized from a benzene-hexane mixture. It had a melting point of 80–82° C.

The 2,2-dimethyl-1-phenyl-1,3-propandiol dicarbamate of this invention manifests a tranquilizing effect. When administered intraperitoneally in guinea pigs, it produces narcosis that emphasizes relaxation and, more particularly, results in muscle relaxation with no tonic spasms after a period of one hour.

An object of this invention, therefore, is to provide a new composition which would manifest a tranquilizing effect in animals, such as domestic animals. For this purpose, the 2,2-dimethyl-1-phenyl-1,3-propandiol dicarbamate may be mixed with a pharmaceutical carrier. For example, 40 g. may be dissolved in 1 kg. of a glyceridic oil such as peanut oil and administered to an animal in a dosage of 0.4 g. per kilogram of body weight. Again, tablets of the dicarbamate may be prepared by granulating the desired amount of dicarbamate with starch and lactose and compressing them into tablets. Other carriers, binder, lubricants and other components may be utilized in conventional manners with the dicarbamate of this invention to produce dosage forms suitable for oral, parenteral or other form of administration.

What is claimed is:
2,2-dimethyl-1-phenyl-1,3-propandiol dicarbamate having the formula:

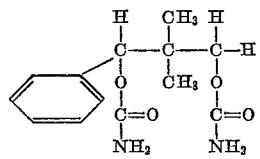

References Cited in the file of this patent
UNITED STATES PATENTS

| | | |
|---|---|---|
| 2,837,560 | Beinfest et al. | June 3, 1958 |
| 2,848,459 | Pribyl et al. | Aug. 19, 1958 |

FOREIGN PATENTS

| | | |
|---|---|---|
| 798,569 | Great Britain | July 23, 1958 |

OTHER REFERENCES

Ludwig et al., J. Amer. Chem. Soc., vol. 73, pp. 5779–5780, December 1951.

UNITED STATES PATENT OFFICE
CERTIFICATE OF CORRECTION

Patent No. 3,040,089                                  June 19, 1962

Kurt Kulka

It is hereby certified that error appears in the above numbered patent requiring correction and that the said Letters Patent should read as corrected below.

Column 1, line 23, for "not" read -- hot --.

Signed and sealed this 23rd day of October 1962.

(SEAL)
Attest:

ERNEST W. SWIDER
Attesting Officer

DAVID L. LADD
Commissioner of Patents